W. R. JONES.
BALANCING AND STEERING DEVICE.
APPLICATION FILED AUG. 9, 1913.
1,102,515.
Patented July 7, 1914.
2 SHEETS—SHEET 1.
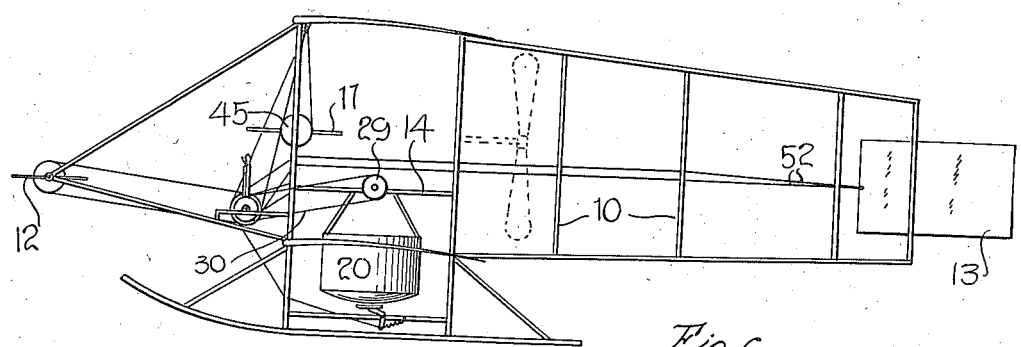
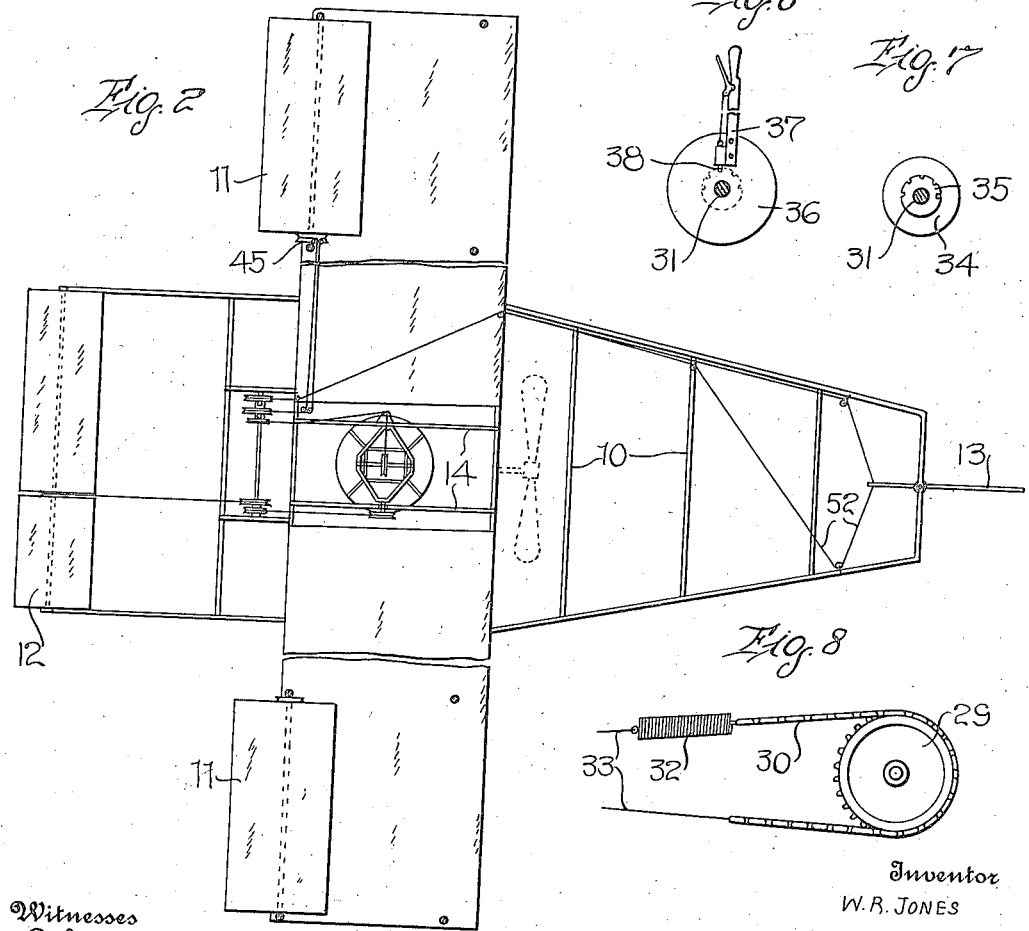
Witnesses
Robert M. Sutphen.
A. I. Hind.
Inventor
W. R. Jones
By Watson E. Coleman
Attorney W. R. JONES.
BALANCING AND STEERING DEVICE.
APPLICATION FILED AUG. 9, 1913.
1,102,515.
Patented July 7, 1914.
2 SHEETS—SHEET 2.
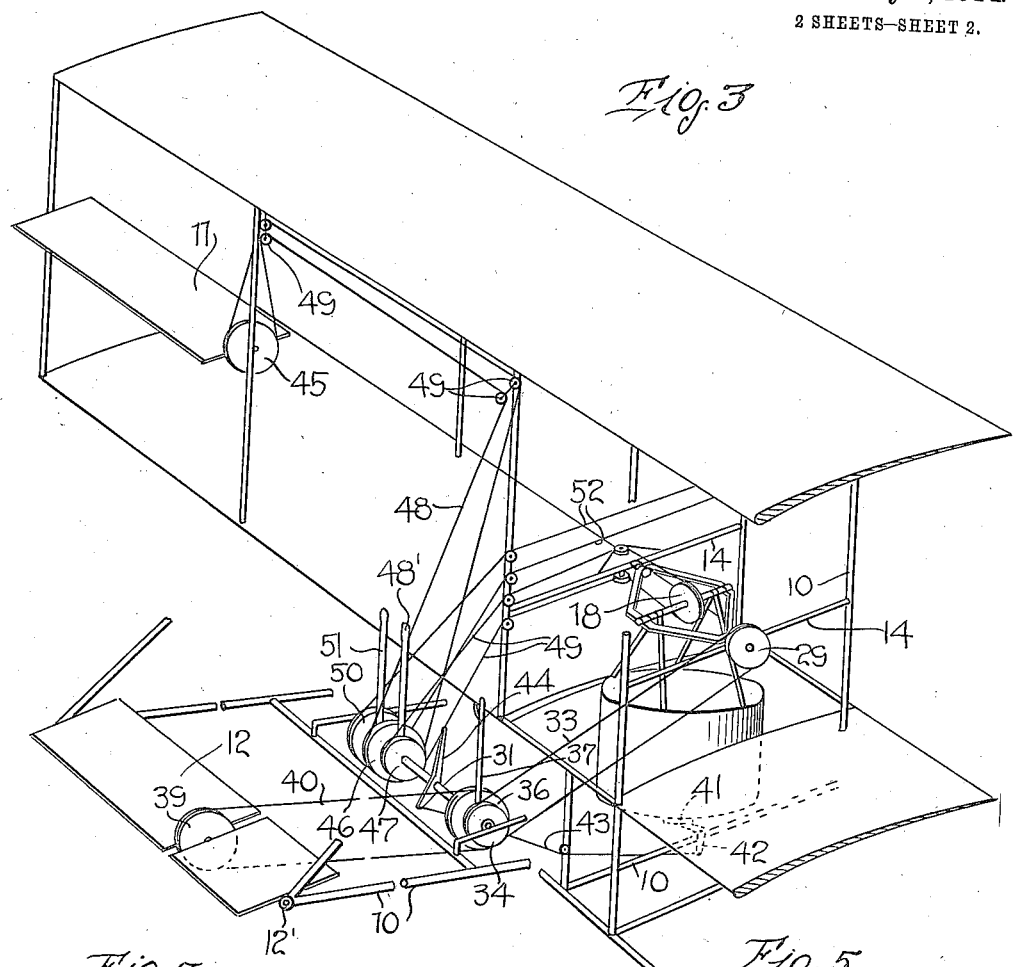
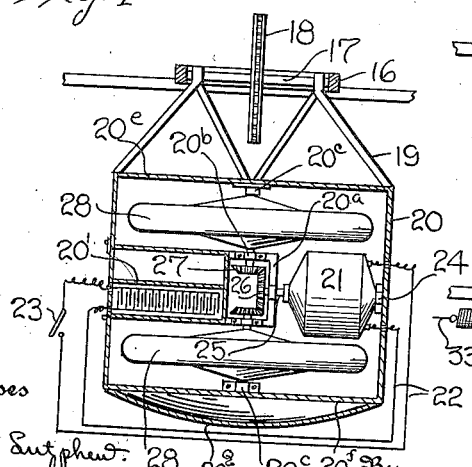
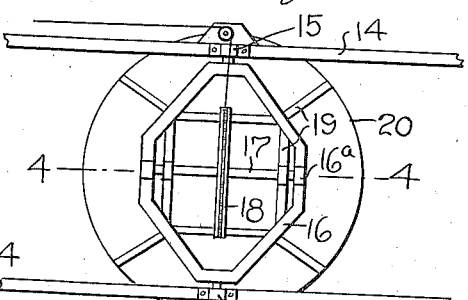
Witnesses
Robert M. Sutphen
A. I. String
Inventor
W. R. Jones
By Watson E. Coleman
Attorney

UNITED STATES PATENT OFFICE.

WILLIAM R. JONES, OF SUMMITVILLE, INDIANA.

BALANCING AND STEERING DEVICE.

1,102,515.  Specification of Letters Patent.  Patented July 7, 1914.

Application filed August 9, 1913. Serial No. 783,995.

*To all whom it may concern:*

Be it known that I, WILLIAM R. JONES, a citizen of the United States, residing at Summitville, in the county of Madison and State of Indiana, have invented certain new and useful Improvements in Balancing and Steering Devices, of which the following is a specification, reference being had to the accompanying drawings.

This invention relates to balancing and steering devices, and it more particularly relates to an automatic balancing and steering device for aeroplanes, submarine vessels, etc.

One of the objects of this invention is to provide an aeroplane or other conveyance with means whereby it may be automatically balanced and steered either in a horizontal plane, in an upwardly or downwardly inclined plane, or in a spiral course, according to the desire and preliminary action of the operator.

Another object of the invention is to provide a device which will, hereinafter be known as a gyro-pendulum which is adapted to be attached to aeroplanes and other conveyances of different designs, and to be operatively connected with the several steering devices thereof in such manner as to steer said conveyance independently of the operator after he has properly manipulated and set said gyro-pendulum and the several steering devices connected therewith.

Another object of the invention is to provide an aeroplane or other conveyance with an automatic steering device and with means associated with the automatic steering device whereby the conveyance may be manually steered independently thereof in a laterally steered independently thereof in a lateral course, while it is being automatically steered in an upward or downward course, and whereby it may be steered by the operator in an upward or downward course and automatically steered in a lateral or horizontal course.

Another object of the invention is to provide the said gyro-pendulum with a storage battery and with an electric motor, the latter being electrically connected with and operated from the storage battery and being operatively connected with two gyroscopes, and to provide a member which constitutes the outer shell or casing of the gyro-pendulum in which the gyroscopes, motor, gearing and storage battery are contained, and to provide the gyro-pendulum with a gimbal which constitutes the only member of the gyro-pendulum which connects with the conveyance which carries it; so that the operation of attaching the gyro-pendulum is greatly simplified.

In the accompanying drawings, which supplement this specification, Figure 1 is a side elevation view of an aeroplane equipped with my improved automatic balancing and guiding device; Fig. 2 is a top plan view thereof; Fig. 3 is a perspective view of a fragmental section of an aeroplane, illustrating somewhat diagrammatically the connection of the automatic steering device with the respective steering planes; Fig. 4 is a fragmental sectional view taken on the line 4—4 of Fig. 5; Fig. 5 is a top plan view of a fragment of the main frame, showing the connection of the gyro-pendulum with the frame; Fig. 6 is an enlarged detail view of one of the steering wheels and the steering lever carried thereby; Fig. 7 is a side elevation view of one of the loosely mounted steering wheels, as viewed from the side opposite to that from which Fig. 6 is viewed; and Fig. 8 is an enlarged detail view, in elevation, of one of the steering sprockets and chains, such as illustrated in Fig. 5.

In these drawings, in which similar reference characters correspond with similar parts throughout the several views, the main frame 10 may be of any ordinary or preferred construction or design, and is provided with ailerons 11, an elevator plane 12, a rudder 13, a propeller, and upper and lower planes, each of which may be of any proper and preferred design or construction.

The frame 10 is provided with a pair of combined braces and supporting bars 14, each of which is provided with a bearing 15 in which is journaled the trunnions 16' of the gimbal 16. This gimbal is provided with bearings 16ª in which are journaled a shaft 17 having a sprocket wheel 18 secured rigidly thereon. A supporting frame 19 is secured rigidly on the shaft 17 and is also secured rigidly to a casing 20 which together with the elements 17, 18 and 19 constitutes the major element of the gyro-pendulum. This casing 20 is preferably cylindrical, although, it is not necessarily of this shape, and is adapted to swing freely in all directions, with relation to the frame 10 and supports 14, on the gimbal 16. The casing 20 is formed with a compartment 20' in which is provided a storage battery, and the walls of this compartment are extended somewhat past the vertical center of the casing 20, so as to provide a gearing frame 20ª which carries vertically alined journal bearings 20ᵇ, which are also in vertical alinement with journal bearings 20ᶜ, the latter being secured to the upper and lower walls of a roof and floor 20ᵉ and 20ᶠ respectively. A motor 21 is electrically connected to the storage battery by means of conductor wires 22, a switch 23 being provided in convenient position to be reached and manipulated by the aviator, so that the motor may be stopped or started at will. The motor 21 is secured to the casing 20, at 24, and the shaft 25 thereof is journaled in the gearing frame 20ª and carries a beveled gear 26 which meshes with two axially alined gears 27, secured on the axles of the gyroscopes 28. It will be seen that when the gear wheel 26 is rotated the gear wheels 27 will be rotated in opposite directions, so as to rotate the gyroscopes in opposite directions.

The effect of a gyroscope is too well known to need further explanation than to state that when these gyroscopes are rotated at a high rate of speed, their axes remain substantially in vertical position or at whatever angle to the vertical they are when the gyroscopes have started and gained a sufficient rate of speed. Herein lies the difference between my gyro-pendulum and an ordinary pendulum, since the latter tends to remain always in a vertical plane, but is prevented from carrying out this tendency by the oscillations which are set up by the various movements of the conveyance by which it is carried. Obviously, because of these oscillations, an ordinary pendulum is rendered impractical and entirely unsatisfactory for the purpose of guiding and controlling an aeroplane or other conveyance.

I may connect my improved gyro-pendulum with the several elements of the conveyance in many ways, according to the attending circumstances, the type of conveyance, etc.; but in the present instance, as illustrated, I provide a sprocket wheel 29 on one of the trunnions 16', a chain 30 being engaged with the sprocket wheel 29 and being connected with a counter shaft 31, through the medium of a coil spring 32, a cable or other flexible member 33 and a transmission wheel 34. This transmission wheel is rotatable on the shaft 31 and rigidly connected to a toothed wheel or segment 35. Movably secured on the shaft 31, adjacent to the wheel 34, is a transmission wheel 36, having a hand lever 37 rigidly secured thereon and carrying a pawl 38 which engages with the teeth of the member 35. Therefore, it will be seen that when the pawl 38 is thus engaged with the member 35, the wheels 34 and 36 are secured in fixed relation with each other, so that the wheel 34 is rotated on the shaft 31. A transmission member 39 is operatively connected with the member 36 by means of a cable or other flexible member 40, said transmission member 39 being rigidly secured to the elevator plane 12, and the latter being pivotally connected at 12' to the main frame 10. Therefore, it will be seen that if the aeroplane tips forwardly and downwardly, the gyro-pendulum retains its vertical position, and this imparts a rearward movement to the upper portion of the wheel 29, with relation to the frame 10, so that the elevator plane 12 has its front end tipped upwardly, through the medium of the transmission members 33, 34, 36, 40 and 39.

The lower surface 20ᵍ of the casing 20 is convexed or curved on a radius having its center at the axes of the trunnions 16', and this convexed surface 20ᵍ constitutes a brake surface with which a brake shoe 41 is adapted to frictionally engage, said brake shoe being carried by a brake lever 42, pivotally connected to an element of the frame 10; and connected with the shaft 31 through the medium of a flexible member 43, is a brake lever 44; the latter being loosely mounted on the shaft 31, and may be actuated by a foot or hand of the aviator, while a ratchet, pawl or any proper means (not shown) may be provided for securing the lever 44 in a set relation with the frame 10; so that if the aviator desires to ascend or descend he may set the brake 41 just before alighting and thereby hold the gyro-pendulum in fixed relation relative to the frame 10 and thus avoid injury to the gyroscopes by the sudden change of angle that would result from the momentum of the pendulum, if allowed to swing freely.

In order to prevent undue lateral tilting of the aeroplane, the ailerons 11 are each rigidly connected to a transmission member 45, which connects with a transmission member 46 loosely mounted on the shaft 31. A wheel 47, constructed as described for the wheel 34, with a toothed segment 35 (see Fig. 7) is connected to the wheel 46 by means of a lever 48, which is provided with a pawl 38, as described for the lever 37, as illustrated in Fig. 6; so that the wheels 46 and 47 may be rigidly connected together or disconnected from each other. The wheel 46 is connected to the wheel 45 through the medium of a flexible transmission member 48, passing over suitable guide pulleys 49, while the transmission member 47 is connected with the transmission member 18, through the medium of a flexible transmisison member 49.

From the description in the preceding paragraph, it is obvious that when the right side, for instance, of the aeroplane tips downward, this imparts a relative leftward movement to the upper portion of the wheel 18, which co-acts with the members 49, 47, 46, 48', 48 and 45, for tipping the forward edge of the ailerons 11 upward (see Fig. 3), which would obviously operate to restore the aeroplane to its normal level.

While I have illustrated transmission means connecting the gyroscope with only one of the ailerons, it is obvious that the other aileron may be similarly connected, so that both of the ailerons may be actuated in unison. It is also obvious that the gyropendulum may also be similarly connected with the wings which are warped or flexed in aeroplanes employing the wing-warped system for balancing the aeroplane laterally.

Journaled on the shaft 31 is a transmission wheel 50 having a lever 51 secured thereto and being connected with the rudder 13 through the medium of a flexible transmission member 52; and the transmission wheel 50, which is of the same size and configuration as the wheel 46, is connected to said wheel 46 by a pawl and ratchet such as illustrated in Figs. 6 and 7, so that when the wheel 46 is turned for actuating the aileron, the wheel 50 is actuated by said wheel 46, for automatically turning the rudder toward the side of the aeroplane on which the aileron is being tipped downward. However, the wheel 50 is provided with a lever 51 which constitutes a manually operable means, for changing the angle of the rudder independently of the wheel 46; so that when the machine is moving on the surface of the ground, or on water, or when moving through the air, under certain weather conditions, the rudder may be manually operated.

It will be seen that I have provided a device of this character which is fully capable of attaining the foregoing objects in a thoroughly practical and effective manner.

While the accompanying drawings illustrate what I believe to be the preferred embodiment of my invention, it is to be understood that the invention is not limited thereto, but that various changes may be made in the construction, arrangement and proportions of the parts without departing from the scope of the invention, as defined in the appended claims.

I claim:—

1. The combination with an aeroplane having an aileron and an elevator plane, of a pendulum including a gimbal, means supporting the gimbal, transmission members carried by the axes of the gimbal, means operatively connecting said transmission means with the aileron, and the elevator plane respectively, and means whereby said aileron and elevator plane may be temporarily thrown out of operative relation with the pendulum and operated manually.

2. The combination with an aeroplane having an aileron and an elevator plane, of a pendulum including a gimbal, means supporting the gimbal, transmission members carried by the axes of the gimbal, means operatively connecting such transmission means with the aileron and elevator plane respectively, and means for controlling such operative connection whereby said aileron and plane may be operated independently of the pendulum.

3. The combination with a body having a balancing member and an elevating member, of a pendulum including a gimbal, means supporting the gimbal, transmission members carried by the axes of the gimbal, means operatively connecting such transmission means with the balancing member and the elevating member respectively, and means for controlling such operative connection whereby such balancing member and elevating member may be operated independently of the pendulum.

4. The combination with a body having a balancing member and an elevating member, of a pendulum including a gimbal and a gyroscope, means supporting the gimbal, transmission members carried by the axes of the gimbal, means operatively connecting such transmission means with the balancing member and the elevating member respectively, and means for controlling such operative connection whereby such balancing member and elevating member may be operated independently of the pendulum.

In testimony whereof I hereunto affix my signature in the presence of two witnesses.

WILLIAM R. JONES.

Witnesses:
    CLAUD M. WALTZ,
    JOHN M. KAUFMAN.